Feb. 1, 1944.  A. SCHWARZ  2,340,405
PHOTOFLASH SYNCHRONIZING MECHANISM FOR CAMERAS
Filed June 23, 1941  2 Sheets-Sheet 1
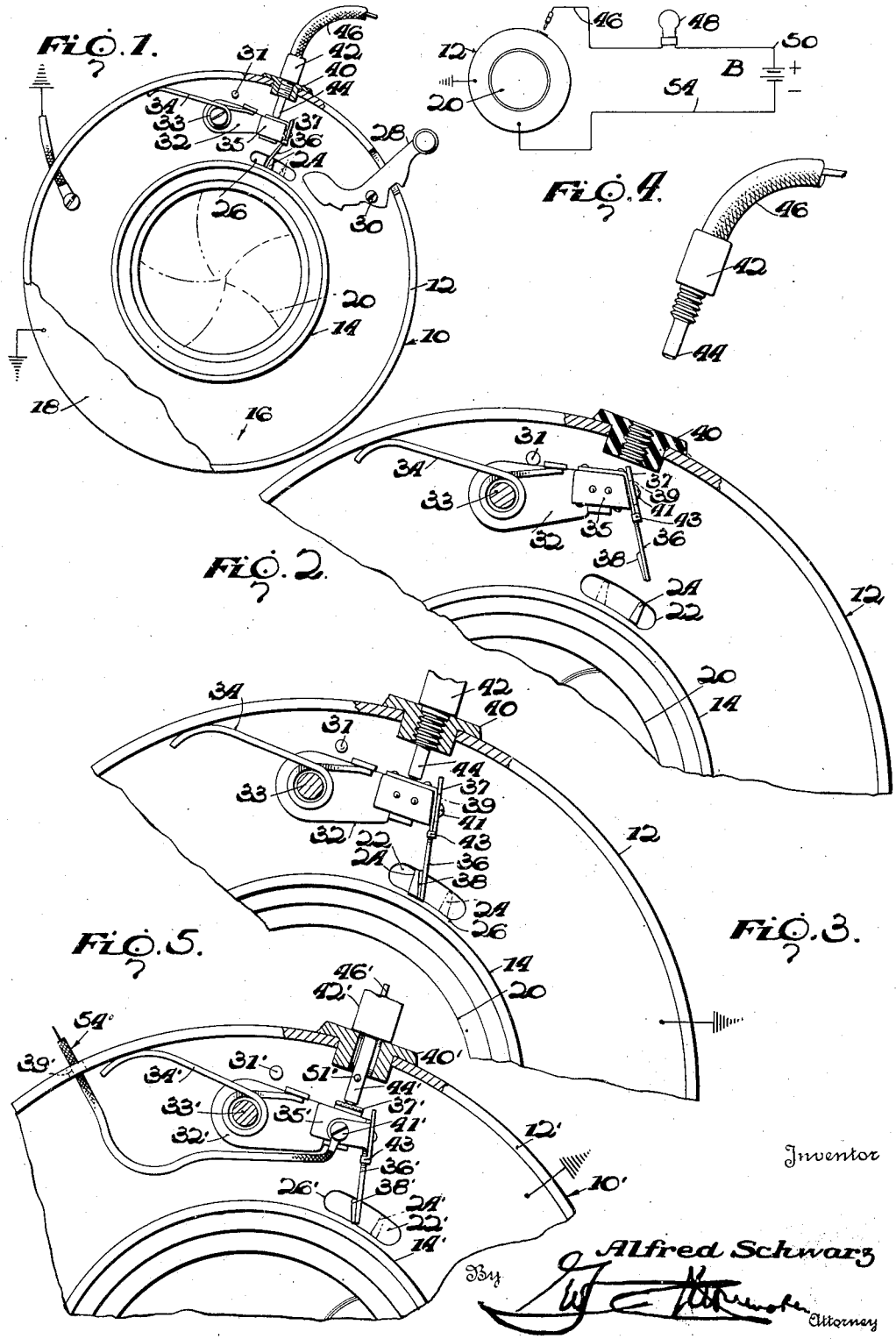
Inventor
Alfred Schwarz
By
Attorney

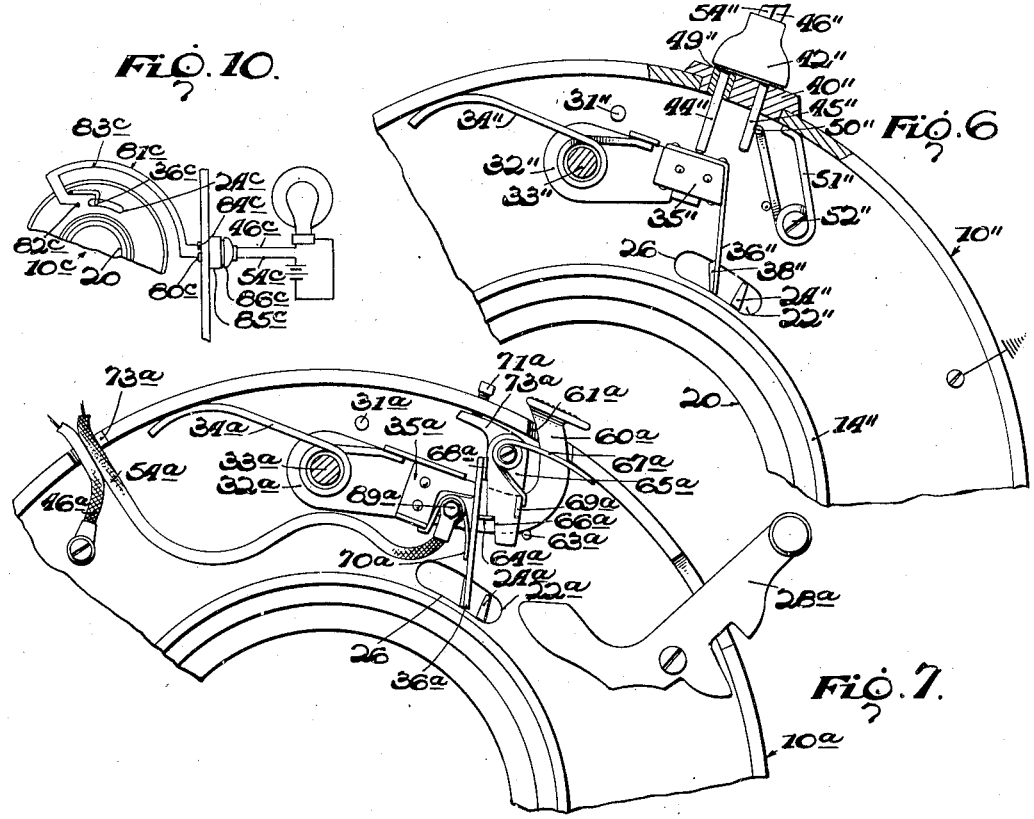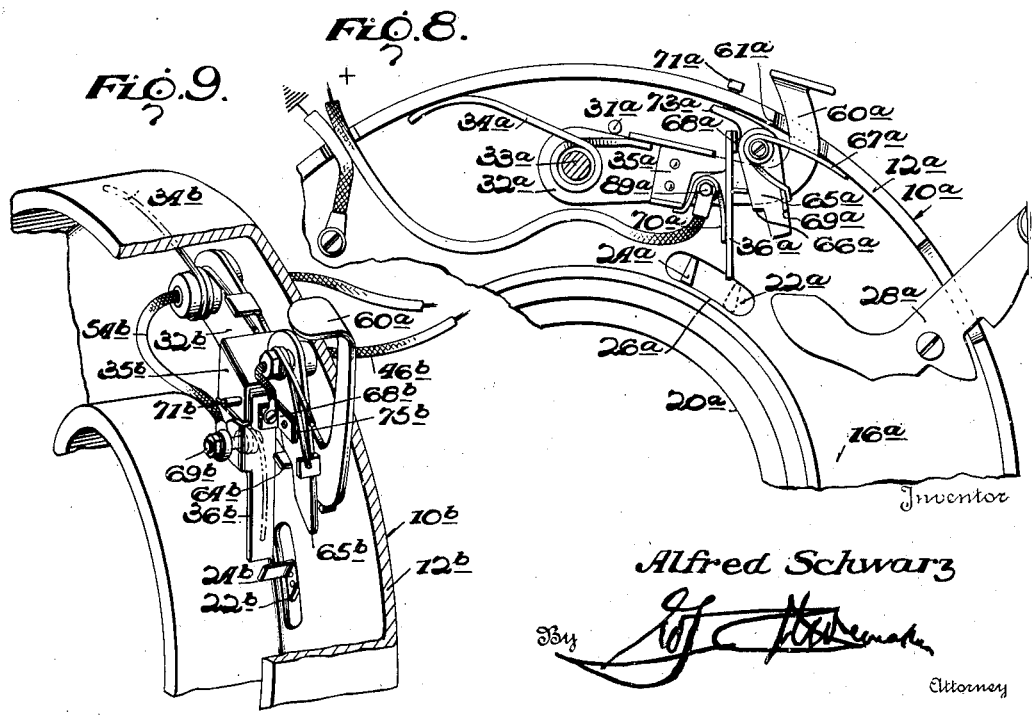

Patented Feb. 1, 1944

2,340,405

UNITED STATES PATENT OFFICE 2,340,405

PHOTOFLASH SYNCHRONIZING
MECHANISM FOR CAMERAS

Alfred Schwarz, Rochester, N. Y., assignor to Ilex Optical Company, Rochester, N. Y., a corporation of New York Application June 23, 1941, Serial No. 399,381

18 Claims. (Cl. 67—29)

The present invention relates to cameras and more particularly to electrical mechanism for setting off a flash in proper synchronization with the shutter thereof.

The improved synchronizing mechanism comprising the present invention is primarily adapted for use with cameras having shutters of the Compur type although the invention is susceptible of modification and, if desired, the same may be employed in connection with cameras having other types of shutters.

It is an established fact that there is a time lag of definite and calculable duration existing from the instant electrical contact is made to the peak of the flash in the flash bulb. This time lag is quite uniform in bulbs of the same rating and manufacture. It is also recognized that there is likewise a time lag in the shutter existing from the moment of its release until it reaches its full maximum open position. The present invention takes into consideration these time lag phenomena and has as one object the provision of a novel means for compensating for the difference in time lag between the shutter opening and the illumination of the bulb and so synchronizes the two that the peak of the flash will occur precisely at the instant of maximum shutter opening. Such an arrangement is of advantage in that once it is adjusted during its manufacture it will continue to function with precision when succeeding bulbs of the same manufacture are employed in photoflash photography. Also, a photoflash mechanism which is properly designed according to the present invention will require no variable adjusting devices for bulbs of the same electrical characteristics such as screws and the like and the original relation of the various parts which cooperate to make up the mechanism will be maintained accurately throughout the useful life thereof.

Photoflash synchronizing mechanism which is built into the shutter casing of a camera are in present use but such mechanisms are intimately and permanently associated with the shutter operating instrumentalities. In most instances there is a positive and permanent connection between some moving part of the shutter operating device and a moving part of the synchronizing mechanism which operates at a two-fold disadvantage in that the photoflash synchronism is actuated each time the shutter is operated whether or not a photoflash picture is to be made while at the same time the positive connection slows down or increases the time lag of the shutter above referred to. Where such mechanical contrivances such as springs, levers and the like are utilized in the construction, uniform operation cannot be attained due to frictional differences that may exist at different times and due to tolerances that may arise when permanent wear sets in. Furthermore such permanent wear is, by such devices, accelerated inasmuch as the photoflash timing mechanism is repeatedly operated needlessly even when no photoflash bulb is used.

It is another important object of the invention to overcome the above noted limitations that are attendant upon the use of existing mechanism by providing a synchronizing mechanism which may be brought into cooperation with the shutter mechanism only when actual use thereof is intended and which, when it is not required, may be placed in an inoperative position where it will not retard or otherwise interfere with the movements of the shutter operating mechanism or the shutter itself.

A similar and related object of the invention is to provide a built-in synchronizing device of this character which may be permanently associated with the camera and which, by a simple lever movement and by a shifting-in operation, may be quickly prepared for potential use.

Another object of the invention is to provide a synchronizing apparatus possessing all of the above noted advantages and which additionally is provided with means whereby after the mechanism has been actively utilized in the making of a photoflash picture it is automatically shifted to its inoperative position out of engagement and cooperation with the shutter mechanism. In this manner an operator is safeguarded against improper use of the apparatus in that the synchronizing mechanism will not be operated during the taking of a succeeding picture and, even if a new photoflash bulb has been installed, it will not be discharged unless it is actually the intention of the operator to so discharge it.

Yet another object of the invention is to provide a synchronizing device for cameras employing electrical means for setting off the bulb and creating the flash together with means for preventing accidental or inadvertent setting off thereof, as for example when the camera is handled and is not in operation.

In carrying out this last mentioned object, the invention in one form thereof contemplates the provision of a camera in which the casing thereof is insulated or electrically independent of the transmission or lead wires leading to the battery and flash bulb in order that in assembling or otherwise handling the control devices or other instrumentalities associated with the mechanism there will be little likelihood of accidental establishment of a circuit through the battery and bulb.

A still further object of the invention, in an apparatus of the type set forth above, is to provide a locking mechanism or device by means of which the circuit closing contacts employed in connection with the battery and flash bulb are locked against closing at such time as the shutter is opened for sighting, focusing or other purposes and in which they remain locked until such time as the shutter is closed.

Yet another object of the invention is to provide a synchronizing device which may be built into the shutter casing of a camera or which may be installed in the shutter casing of existing cameras not having synchronizing facilities and which, in either case, will require no modification or alteration of the shutter operating instrumentalities or of the shutter itself.

The provision of a synchronizing apparatus which will secure greater accuracy in synchronization between the movements of the shutter and the flash; one which is simple and reliable; one which is comprised of a minimum of parts and which therefore is unlikely to get out of order; one which may be manufactured economically; one in which the actuating mechanism is for the most part enclosed within the shutter casing and which therefore is protected from moisture, dust and the like, and one which requires no particular degree of skill for its operation, are further desiderata that have been borne in mind in the production and development of the present invention.

With these and other objects in view which will become more readily apparent as the nature of the invention is better understood, the same consists in the novel construction, combination and arrangement of parts shown in the accompanying drawings, in which:

Figure 1 is a fragmentary front elevational view of a shutter casing with the cover plate broken away and showing one form of the improved synchronizing mechanism applied thereto.

Figure 2 is an enlarged fragmentary view similar to Figure 1 showing the parts of the mechanism in a different position.

Figure 3 is a similar fragmentary view showing the parts in a third position.

Figure 4 is a diagrammatic view of the synchronizing device showing the same applied to a camera shutter mechanism.

Figure 5 is a fragmentary view similar to Figures 2 and 3 showing a modified form of the invention.

Figure 6 is a fragmentary view similar to Figure 5 showing another modified form of the invention.

Figure 7 is a similar fragmentary view showing a still further modified form of the invention.

Figure 8 is a view similar to Figure 7 showing the parts thereof in a different position.

Figure 9 is a perspective fragmentary view on an enlarged scale of the apparatus shown in Figures 7 and 8 but showing a different electrical connection therefor.

Figure 10 is a fragmentary diagrammatic view similar to Figure 6 showing a further modified form of the invention.

In all of the above described views, like reference characters are employed to designate like parts throughout.

Referring now to Figures 1 to 4, inclusive, the improved synchronizing mechanism is shown as being applied to a generally cylindrical ring-like shutter casing 10 having outer and inner cylindrical walls 12 and 14, a rear wall 16 and a removable cover plate 18. A shutter 20 which may be of the Compur type is adapted to have its opening and its closing movements controlled by means of a control ring 22 having a lug 24 formed thereon which projects into the casing 10 through a slot 26.

The mechanism whereby the ring 22 is actuated to control the opening and closing movements of the shutter 20 forms no part of the present invention and reference may be had to United States patent to Brueck, No. 2,129,561, dated September 6, 1938, for a Shutter operating mechanism, for a full disclosure of a shutter actuating mechanism capable of application to the present shutter. It is deemed sufficient to state that the lug 24 may cooperate with an actuator of the type shown in the said patent and that the actuator, by an unchecked movement in one direction, serves to shift the position of the ring 22 first in a counterclockwise direction as viewed in Figure 1 to open the shutter, and then in a clockwise direction to close the same. Such movement of the shutter is ordinarily substantially instantaneous but if desired a shutter retarding mechanism such as is shown in the said patent may be incorporated in the shutter control mechanism. Instead, however, of effecting cooperation between the lug 24 and the shutter actuating mechanism, it is preferable to provide an additional lug which projects through a slot in the wall 16 of the casing in order that the lug 24 may be utilized solely for synchronizing purposes as will appear presently.

A master control lever 28 is pivoted as at 30 to the wall 16 of the casing 12 and by means of this lever and other additional manually available control devices (not shown) the movements of the shutter are regulated or controlled as fully disclosed in the above-mentioned U. S. Patent No. 2,129,561.

Still referring to Figs. 1 to 4, inclusive, a lever 32 is pivoted as at 33 to the rear wall of the casing 16 and is normally urged by means of a spring 34 against a stop pin 31 as shown in Figure 2 and in this position of the lever the synchronizing mechanism is in an inoperative position. Mounted upon an insulating block 35 carried at the free end of the lever 32 is an adjustable contact spring 36 in the form of a finger, the free end of which is adapted to project into the path of movement of the lug 24 when the lever 32 is swung to its operative position as shown in Fig. 1. An insulating strip 38 is secured to the free end of the contact spring 36 on one side thereof and prevents electrical contact between the lug 24 and spring during the closing movements of the shutter 20 in a manner and for a purpose that will be subsequently described.

A hollow threaded sleeve or nipple 40 extends through the outer wall 12 of the casing 10 in the vicinity of the lever 32 and is formed of insulating material. A jack 42 is provided with a plunger or prong 44 and is adapted to be threadedly received in the nipple 40 in such a manner that when the jack and nipple are in full threaded engagement the prong 44 abuts against a portion of the contact spring 36 and depresses the lever 32 to such an extent that the free end of the contact spring 36 is moved into the path of movement of the lug 24.

The prong 44 of the jack 42 is electrically connected by means of a conductor wire or cable 46 in an electrical circuit including a conventional photo-flash bulb 48 (Fig. 4) which is connected by a lead 50 to one terminal of a battery B which in turn is connected by a lead 54 to the casing 10. The casing is thus "grounded" as well as are the various operating instrumentalities including the lug 24 while the contact spring 36 remains insulated therefrom and, being connected to a terminal of the battery B through the photo-flash bulb 48, provides in combination with the lug 24 a pair of electrical contacts by means of which the electrical circuit may be established through the bulb 48.

It will be seen that upon movement of the lug 24 from the dotted line position thereof shown in Figure 1 to the full line position thereof the lug engages the lower end of the contact spring 36 on one side of the latter and displaces the same to a slight extent and establishes an electrical contact between the insulated spring and the casing 10, thus closing the circuit through the photo-flash bulb 48 as previously described. In the manufacture and assembly of the apparatus the various parts are so constructed and adjusted that such contact will occur precisely at the moment which will result in simultaneous arrival of the shutter at its fully open position and attainment of the peak intensity of the flash. Thereafter, upon the return movement of the lug 24 to its initial position, the contact spring 36 is released and assumes its normal position as shown in dotted lines in Fig. 1 where it is positioned in the path of movement of the lug and is ready to be again engaged and displaced by the latter at the time the next photographic exposure is made.

It is to be noted that when the lever 32 is maintained in its depressed or operative position as shown in Fig. 1 the tension of the spring 34 holds the same in intimate contact with the prong 44 and thus a positive electrical connection is obtained between these parts. It should also be noted that when the jack 42 is withdrawn from the nipple 40 the contact spring is moved completely out of the path of movement of the lug 24 as shown in Figure 2 and normal operation of the shutter mechanism, unhindered by any association with the synchronizing mechanism, may take place.

In order to accommodate flash bulbs having different electrical characteristics and consequently different time lag phenomena, means is provided for varying the effective length of the spring 36. Toward this end a rigid plate 37 is slotted as at 39 and overlies the spring 36. A clamping screw 41 extends through the slot 39 and spring 36 and serves to anchor the plate 37 in any desired adjusted position. A pair of ears 43 are formed on the plate 37 and extend around the spring 36 and loosely engage the latter. By adjusting the position of the shiftable plate 37 the effective yielding portion of the spring 36 may be varied to vary the resistance offered by the spring to the lug 24 and thus retard the opening and closing movements of the shutter.

Referring now to Fig. 3, the shutter 20 is shown in its open position. Such a position of the shutter may arise by virtue of the focusing operation wherein the operator after securing proper focus neglects to close the shutter. In such an instance if the jack 42 is threaded into the nipple 40 the lever 32 will be moved to its operative position and the free end of the contact 36 will be projected into the path of return movement of the lug 24 behind the latter. Ordinarily, if a fresh photo-flash bulb is present in the electrical circuit, such return movement of the lug 24 would cause electrical contact to be made with the contact spring 36 and loss of a bulb would result. Such loss is prevented, however, by virtue of the insulating strip 38 which is engaged by the lug during its return movement. The strip 38 prevents electrical contact between the lug and spring and the latter, by virtue of its resiliency, may trip over the lug 24 and the various parts will subsequently assume their normal potential operative positions preparatory to the next succeeding photo-flash exposure. It is to be noted that the tension exerted by the spring finger or contact spring 36 on the lug during its movement in either direction is very slight and is just sufficient to create the necessary electrical contact. Thus the normal free movements of the shutter are not appreciably impaired.

Referring now to Fig. 5 wherein a slightly modified form of the invention is shown, the construction and arrangement of the lever 32', insulating block 35', contact spring 36' and other associated parts are substantially the same as the corresponding parts shown in Fig. 1 and accordingly, similar reference characters have been applied thereto and a full description thereof is thought to be unnecessary. In this form of the invention the nipple 40' is formed of conductive material and the casing 10' is thus "grounded" by means of the conductor cable 46' in the electric circuit containing the photo-flash bulb. The plunger or prong 44' is maintained insulated from the contact spring 36' by means of an insulating strip 37' against which it is adapted to bear. Instead of providing a threaded connection between the jack 42' and nipple 40', a detachable pin and slot connection 51' may be employed. Irrespective, however, of the type of connection used, the essential features of the invention are preserved. A conductor 54' leading from the plus terminal of the battery (not shown) passes through a slot 39' provided in the wall 12' of the casing and is secured electrically to the contact spring 36' by means of a binding post or screw 41'. In this form of the invention, the operation of the various parts is substantially the same as in the form of the invention shown in Figs. 1 to 4, inclusive. It will be noted, however, that with the present arrangement no particular degree of care need be exercised by the operator in inserting the jack 42' in the nipple 40' inasmuch as inadvertent contact between the prong 44' and the casing which are at the same electrical potential, i. e., ground potential, will have no effect upon the electrical circuit. Proper electrical contact may be had only when the lug 24' is moved by the shutter mechanism into engagement with the contact spring 36 in the manner previously described in connection with the other form of the invention.

In Fig. 6 the arrangement of the lever 32", insulating block 35", contact spring 36", etc., remains substantially the same as in the forms of the invention previously described and similar reference characters have been employed in this view to designate corresponding parts. In this form of the invention a somewhat different method of preventing inadvertent electrical contact when handling the apparatus is employed.

The electrical circuit for the photo-flash bulb includes a pair of conductors 54" and 46" which form the conducting elements of a dual covered cable assembly and these cables are connected at adjacent ends to a pair of prongs 44'' and 45'' forming part of a removable jack 42'' and one of which is longer than the other. The longer prong 44'' is designed for cooperation with the contact spring assembly 32'', 33'', 36'', etc., and is adapted to bear directly against the contact spring 36'' when the jack 42'' is received in the nipple 40'' provided for it and make electrical contact with the spring. The shorter prong 45'' is adapted to be connected through the nipple 40'' directly to the casing 10'' while the prong 44'' is maintained insulated therefrom by an insulating plug 49''. The prong 45'' is formed with a recess 50'' which is designed for latching engagement with one end of a spring 51'' secured to the casing as at 52'' to maintain the jack 42'' firmly seated in position when the parts are in their operative position.

The operation of this form of the invention is similar to the operation of the forms of the invention previously described and briefly consists in the projection of the free end of the contact spring 36'' into the path of movement of the lug 24'' when the jack 42'' is inserted into its nipple or receptacle 40''. Because of the firm yielding contact between the prong 44'' and the spring 36'' a circuit is closed when the lug 24'' engages the spring 36'' and current flows from the battery through the conductor 46'', through the prong 45'' to the casing 10'' and from thence through the lug 24'', contact spring 36'', prong 44'' and cable 54'' to the photo-flash bulb which is thus discharged, and from thence to the positive terminal of the battery B.

It is to be noted that because of the fact that the prong 44'' is longer than the prong 45'' the casing 10'' cannot be grounded until the jack 42'' is fully received in its receptacle 40''. Thus, accidental contact between the casing and either prong of the jack 42'' will have no effect on the electrical circuit leading through the flash bulb.

In Figs. 7 and 8 another form of the invention is shown employing a synchronizing mechanism of the set type in which the photo-flash instrumentalities are permanently associated with the camera shutter casing 10a and in which the contact spring and lever assembly 32a, 36a, etc., is shifted to its operative position by a simple manual operation and is automatically released from this position after the shutter has been actuated and the photo-flash bulb discharged. By such an arrangement the camera may be prepared for photo-flash operation in a minimum of time while at the same time a discharged flash bulb may safely be replaced immediately after use without danger of subsequent accidental discharge thereof inasmuch as a resetting operation is necessary before the apparatus is capable of potential operation.

Referring now to these two views in detail, the lever 32a is formed with an extension 60a in the form of a finger-actuated plunger which projects outwardly through a slot 61a in the outer wall 12a of the casing 10a. Inward movement of the lever 32a and its extension 60a is limited by a post 63a secured to the rear wall 16a. The extension 60a is formed with a lug 64a thereon which cooperates with a locking detent lever 65a having a recess 66a which is adapted to engage the lug 64a and lock the lever 32a in its operative shifted in position as shown in Fig. 7. A spring 67a bearing at one end against the wall 12a and at the other end against a lug 69a normally urges the detent lever 65a into locking engagement with the lever 32a. The extent of such locking engagement is determined by means of an adjustable stop 71a which is threaded in the casing wall 12a and which engages an extension 73a formed on the lever 65a.

A contact lever 36a is pivotally supported as at 89a from the insulating block 35a and is thus insulated from the lever 32a. A spring 70a is insulated from the lever 32a and normally urges the lever 36a in a counterclockwise direction on the insulating block 35a and the extent of this movement is limited by means of a stop formed on the block 35a. The upper end of the insulated contact lever 36a is designed for engagement with a lug 68a on the detent lever but is normally maintained out of such engagement by means of the spring 70a. However, at such time as the actuating lug 24a on the shutter actuating ring 22a is moved into engagement with the lower end of the contact lever 36a this latter lever is tilted against the action of its restraining spring 70a and its upper end engages the lug 68a and kicks the detent out of locking engagement with the lever 32a thus permitting the latter to return to its inoperative position under the influence of the spring 34a. At the same time, contact between the contact lever 36a and the lug 24a closes an electrical circuit through the flash bulb in the manner previously described in connection with other forms of the invention by virtue of the fact that the cables 54a and 46a are led into the casing through a slot 73a and are connected respectively to the casing 10a and the contact lever 32a. It will be noted that the normal position of the lever 65a may be shifted by means of the adjusting screws 71a in order to control the precise moment of electrical contact between the lever 36a and lug 24a and compensate for the time lag phenomena of different flash bulbs.

The arrangement of parts shown in Fig. 9 is very similar to that shown in Figs. 7 and 8 and corresponding parts have been designated by similar reference characters to avoid a detailed description. In this form of the invention, however, the lug 68b, instead of being formed on the detent lever 65b as in the other form of the invention, is insulated from this lever by means of an insulating strip 75b and is connected by means of a conductor 46b to the negative terminal of the battery. The tilting contact lever 36b is connected through the flash bulb to the positive terminal of the battery by means of a conductor 54b. Thus the casing 10b is not grounded and the electrical circuit including the flash bulb can be closed only at such time as the contact lever 36b engages the contact lug 68b for the purpose of kicking the detent lever 65b out of holding engagement with the lever 32b. Otherwise the operation of this form of the invention remains the same as in the form shown in Figs. 7 and 8.

In the various forms of the invention thus far described the removable plug or jack connection has been associated with the shutter casing 10, 10', 10'', etc. Such illustration has been purely for illustrative purposes and equally good results may be obtained if these connections are made to the camera casing either by a grounded connection or by an insulated connection. In Fig. 10 the arrangement of parts which cooperate to make up the synchronizing device is similar to that shown in Fig. 6 but in this form of the invention the contact spring 36c is electrically connected by a lead 83c to one terminal 80c of a female electrical connection 85c while a stationary contact member 82c is mounted on the casing 10c and is connected by a lead 81c to the other terminal 84c of the connection 85c. Contact with the terminals 80c and 84c may be had by means of a male plug member 86c having conductors 46c and 54c leading therefrom by means of which the flash bulb circuit is completed. Unlike the form of the invention shown in Fig. 6, no provision is made for preventing reversal of the plug member 85c inasmuch as the flash light circuit through the battery may be completed regardless of the polarity of the terminal connections at the camera casing.

The invention is not to be limited to the exact arrangement of parts shown in the accompanying drawings or described in the specification as various changes in the detail of construction may be resorted to without departing from the spirit of the invention, for example, while the present invention has for illustrative purposes been shown in connection with the Compur type, the movements of which are controlled by means of an oscillatable ring member, the invention may with but slight modification be adapted for use in connection with other forms of shutter control mechanisms. Only insofar as the invention has particularly been pointed out in the accompanying claims is the same to be limited.

What is claimed is:

1. The combination with a camera shutter, operating means for the shutter including an oscillatable member movable throughout each cycle in opposite directions to control the shutter and make a complete exposure during each cycle, of a spring finger bodily movable into and out of the path of movement of the oscillatable member, a pivoted lever carrying the spring finger in its movement into and out of the path of movement of the oscillatable member, a separate spring normally urging the lever into an initial position wherein it is out of said path of movement, means for projecting the finger bodily into said path of movement against the action of said spring, means insulating the finger and oscillatable member from each other, means connecting the finger and member in a flashlight circuit, and means for adjusting the spring finger for varying its effective length without changing its operative relation to the path of movement of the oscillatable member so that contact will occur always at the same part of said path.

2. The combination with a camera shutter, operating means for the shutter including an oscillatable member movable throughout each cycle in opposite directions to control the shutter and make a complete exposure during each cycle, of a yieldable finger bodily movable into and out of the path of movement of the oscillatable member and engageable with the latter during movement thereof in one direction, a pivoted lever carrying the spring finger in its movement into and out of the path of movement of the oscillatable member, a separate spring normally urging the lever into an initial position wherein said spring finger is out of said path of movement, an insulating strip secured to said finger on one side thereof and engageable with the oscillatable member during movement thereof in the other direction when said finger is projected into said path prior to a complete oscillation cycle to prevent contact between the finger and member, means normally insulating said finger and oscillatable member from each other, means connecting the finger and member in a flashlight circuit, means for moving said finger into the path of movement of the oscillatable member, and means for adjusting the spring finger for varying its effective length without changing its operative relation to the path of movement of the oscillatable member so that contact will occur always at the same part of said path.

3. The combination with a camera shutter, operating means for the shutter including an oscillatable member movable throughout each cycle in opposite directions to control the shutter and make a complete exposure during each cycle, of a spring finger movable from a retracted position wherein it is out of the path of movement of said oscillatable member to an advanced position wherein one end thereof is in said path of movement and is engageable by said oscillatable member during movement thereof in one direction, a pivoted lever carrying the spring finger in its movement into and out of the path of movement of the oscillatable member, a separate spring normally urging the lever into an initial position wherein its end is out of said path of movement, an insulating strip secured to the end of the finger on one side thereof and engageable with the oscillatable member for tripping movement thereover during movement of the latter in the other direction when the end of the finger is projected into said path prior to a complete oscillation cycle of the member to prevent contact between the end of the finger and the member, means for adjusting the spring finger for varying its effective length without changing its operative relation to the path of movement of the oscillatable member so that contact will occur always at the same part of said path, means connecting the finger and member in a flashlight circuit, and means for moving said finger into the path of movement of the oscillatable member 4. The combination with a camera shutter, a shutter casing having an opening therein, and operating instrumentalities for the shutter within the casing and including an oscillatable member movable in opposite directions to control the shutter and make a complete exposure during each cycle, of a yieldable finger disposed within the casing and bodily movable into and out of the path of movement of the oscillatable member, means normally maintaining the finger out of said path of movement, means adapted to be manually projected through the opening in said casing and engageable with the finger for projecting the same bodily into the path of movement of the oscillatable member, means insulating said finger and oscillatable member from each other, and means including said manually projectable means for connecting the finger and member in a flashlight circuit.

5. The combination with a camera shutter, a shutter casing having an opening therein, and operating instrumentalities for the shutter within the casing and including an oscillatable member movable in opposite directions to control the shutter and make a complete exposure during each cycle, of a yieldable finger disposed within the casing and movable bodily from a retracted position wherein it is out of the path of movement of the oscillatable member to an advanced position wherein it is positioned directly in said path and adapted to be engaged by the oscillatable member, a spring normally urging the finger to its retracted position, a plunger adapted to be manually projected through the opening in said casing and engageable with the finger for projecting the same bodily into the path of movement of the oscillatable member against the action of said spring, means normally insulating said finger and oscillatable member from each other, and means including said plunger for connecting the finger and member in a flashlight circuit.

6. The combination with a camera shutter, a shutter casing having an opening therein, and operating instrumentalities for the shutter within the casing and including an oscillatable member movable in opposite directions to control the shutter and make a complete exposure during each cycle, of a yieldable finger disposed within the casing and movable bodily from a retracted position wherein it is out of the path of movement of the oscillatable member to an advanced position wherein it is positioned directly in said path and adapted to be engaged by the oscillatable member, a spring normally urging the finger to its retracted position, a plunger adapted to be manually projected through the opening in said casing and engageable with the finger for projecting the same bodily into the path of movement of the oscillatable member against the action of said spring, means normally insulating said finger and oscillatable member from each other, and means independent of said plunger for connecting the finger and member in a flashlight circuit.

7. The combination with a camera shutter, a shutter casing having an opening therein, and operating instrumentalities for the shutter within the casing and including an oscillatable member movable in opposite directions to control the shutter and make a complete exposure during each cycle, said member being electrically connected to the casing, of a yieldable finger disposed within the casing and bodily movable into and out of the path of movement of the oscillatable member, means normally maintaining the finger out of said path of movement, a conductive plunger adapted to be manually projected through said opening in said casing and engageable with the finger for projecting the same bodily into the path of movement of the oscillatable member, means insulating said plunger from the casing, and means including said plunger for connecting the finger and member in a flashlight circuit.

8. The combination with a camera shutter, a shutter casing having an opening therein, and operating instrumentalities for the shutter within the casing and including an oscillatable member movable in opposite directions to open and close the shutter and make a complete exposure during each cycle, said member being electrically connected to the casing, of a yieldable finger disposed within the casing and bodily movable into and out of the path of movement of the oscillatable member, means normally maintaining the finger out of said path of movement, a conductive plunger adapted to be manually projected through said opening in said casing and engageable with the finger for projecting the same bodily into the path of movement of the oscillatable member, means establishing an electrical connection between the plunger and the casing, means on said finger insulating the plunger from the finger, and means including the plunger for connecting the finger and member in a flashlight circuit.

9. The combination with a camera shutter, a shutter casing having an opening therein, and operating instrumentalities for the shutter within the casing and including an oscillatable member movable in opposite directions to open and close the shutter and make a complete exposure during each cycle, of a movable finger disposed within the casing, a tiltable contact lever pivotally mounted on the finger and bodily movable therewith, said finger being movable from a retracted position wherein the lever is out of the path of movement of the oscillatable member to an advanced position wherein the lever is directly in said path of movement, a spring normally urging the finger to its retracted position, a manually depressible member on said finger extending exteriorly of the casing and adapted upon depression thereof to move the finger to its advanced position against the action of said spring, means for releasably locking the finger in its projected position, means operable upon engagement between the oscillatable member and lever for releasing said locking means, means normally insulating the contact lever and oscillatable member, and means connecting the lever and oscillatable member in a flashlight circuit.

10. The combination with a camera shutter, a shutter casing having an opening therein, and operating instrumentalities for the shutter within the casing and including an oscillatable member movable in opposite directions to open and close the shutter and make a complete exposure during each cycle, of a movable finger disposed within the casing, a tiltable contact lever pivotally mounted on the finger and bodily movable therewith, said finger being movable from a retracted position wherein the lever is out of the path of movement of the oscillatable member to an advanced position wherein the lever is directly in said path of movement, a spring normally urging the finger to its retracted position, a manually depressible member on said finger extending exteriorly of the casing and adapted upon depression thereof to move the finger to its advanced position against the action of said spring, means for releasably locking the finger in its projected position, means operable upon engagement between the oscillatable member and lever for releasing said locking means, a contact positioned in the path of tilting movement of the contact lever, means normally insulating the contact lever and contact, and means connecting the contact lever and contact in a flashlight circuit.

11. The combination with a camera shutter, a shutter casing therefor, and operating instrumentalities for the shutter within the casing and including an oscillatable member electrically connected to the casing and movable in opposite directions to open and close the shutter and make a complete exposure during each cycle, of a yieldable finger bodily movable into and out of the path of movement of the oscillatable member, means normally maintaining the finger out of said path of movement, a socket member mounted on the casing and provided with a pair of prong-receiving apertures therethrough, a contact jack having a pair of contact prongs designed for reception in said apertures, one of said prongs when received in its respective aperture being engageable with said finger for projecting the same into the path of movement of the oscillatable member, means normally insulating said finger and oscillatable member from each other, means engageable with the other prong when received in its respective aperture for electrically connecting the latter to the casing, and means connecting said prongs in a flashlight circuit.

12. The combination with a camera shutter, a shutter casing therefor, and operating instrumentalities for the shutter within the casing and including an oscillatable member electrically connected to the casing and movable in opposite directions to open and close the shutter and make a complete exposure during each cycle, of a yieldable finger bodily movable into and out of the path of movement of the oscillatable member, means normally maintaining the finger out of said path of movement, a socket member mounted on the casing and provided with a pair of prong-receiving apertures therethrough, a contact jack having a relatively long prong and a relatively short prong designed for reception in said apertures, the longer prong being engageable with said finger for projecting the same into the path of movement of the oscillatable member when said prong is received in its respective aperture, means normally insulating said finger and oscillatable member from each other, means engageable with the shorter prong for electrically connecting the latter to the casing when the latter prong is received in its respective aperture, and means connecting said prongs in a flashlight circuit.

13. The combination with a camera shutter, a shutter casing therefor, and operating instrumentalities for the shutter within the casing and including an oscillatable member electrically connected to the casing and movable in opposite directions to open and close the shutter and make a complete exposure during each cycle, of a yieldable finger bodily movable into and out of the path of movement of the oscillatable member, means normally maintaining the finger out of said path of movement, a socket member mounted on the casing and provided with a pair of prong-receiving apertures therethrough, a contact jack having a relatively long prong and a relatively short prong designed for reception in said apertures, the longer prong being engageable with said finger for projecting the same into the path of movement of the oscillatable member when said prong is received in its respective aperture, means normally insulating said finger and oscillatable member from each other, means engageable with the shorter prong for electrically connecting the latter to the casing when the latter prong is received in its respective aperture, and means connecting said prongs in a flashlight circuit, there being a locking recess formed in the side of said shorter prong, a yieldable detent member adapted to be received in said recess when the prong is received in its respective aperture for frictionally holding the prong in position, said detent member establishing electrical communication between the shorter prong and the casing, and means connecting said prongs in a flashlight circuit.

14. The combination with a camera shutter, operating means for the shutter including an oscillatable member movable in opposite directions to open and close the shutter and make a complete exposure during each cycle, of a yieldable finger bodily movable into and out of the path of movement of the oscillatable member, and adapted to be displaced upon engagement by the latter, a contact positioned in the path of displacement of the finger, means normally maintaining the finger out of the path of movement of the oscillatable member, means for projecting the finger bodily into said path of movement, means normally insulating the finger and contact, and means connecting the finger and contact in a flashlight circuit.

15. The combination with a camera shutter, operating means for the shutter including an oscillatable member movable in opposite directions to open and close the shutter and make a complete exposure during each cycle, of a yieldable finger bodily movable into and out of the path of movement of the oscillatable member, and adapted to be displaced upon engagement by the latter, a contact positioned in the path of displacement of the finger, means normally maintaining the finger out of the path of movement of the oscillatable member, means for projecting the finger bodily into said path of movement, means normally insulating the finger and contact, means connecting the finger and contact in a flashlight circuit, and means for varying the effective yielding resistance of said finger.

16. The combination with a camera shutter, and operating means for the shutter including a casing having outer and inner cylindrical walls, an oscillatable member in the casing movable throughout each cycle of oscillation in opposite directions to control the shutter and make a complete exposure during each cycle, of a lever mounted between said outer and inner cylindrical walls and spaced therefrom for swinging movement toward and away from said member and movable from an inoperative position remote from the member to an operative position in close proximity thereto, a yieldable finger carried by said lever at one end thereof and movable bodily into and out of the path of movement of the oscillatable member upon swinging movement of said lever, a spring mounted at the opposite end of said lever and spaced from said finger normally yieldably urging said lever to its inoperative position wherein the finger is out of the path of movement of said member, means for moving said lever to its operative position wherein the finger is disposed in said path of movement, means for adjusting the yieldable finger to vary its effective length without varying its operative relation to the path of movement of the oscillatable member so that contact will occur always at the same part of said path, means insulating said finger and oscillatable member, and means connecting the finger and member in a flashlight circuit.

17. The combination with a camera shutter, operating means for the shutter including an oscillatable member movable throughout each cycle in opposite directions to control the shutter and make a complete exposure during each cycle, of a spring finger bodily movable into and out of the path of movement of the oscillatable member, a pivoted lever carrying the spring finger in its movement into and out of the path of movement of the oscillatable member, a separate spring normally urging the lever into an initial position wherein it is out of said path of movement, means for projecting the finger bodily into said path of movement against the action of said spring, means insulating the finger and oscillatable member from each other, means for adjusting the spring finger for varying its effective length and maintaining its operative relation to the path of movement of the oscillatable member so that contact will occur always at the same part of said path, and means connecting the finger and member in a flashlight circuit.

18. The combination with a camera shutter, and operating means for the shutter including an oscillatable member movable throughout each cycle of oscillation in opposite directions to control the shutter and make a complete exposure during each cycle, of a lever mounted for swinging movement toward and away from said member and movable from an inoperative position remote from said member to an operative position in close proximity thereto, a yieldable spring finger mounted on said lever and being of such weight as to offer substantially no resistance to the movement of the oscillatable member and movable bodily into and out of the path of the oscillatable member upon swinging movement of the lever, a relatively heavy spring of such rigidity as not to be influenced by the shutter mechanism normally urging said lever to its inoperative position wherein the spring finger is out of the path of movement of said oscillatable member, means for moving said lever to its operative position wherein the spring finger is disposed in said path of movement, means insulating said finger and oscillatable member, and means connecting the finger and member in a flashlight circuit.

ALFRED SCHWARZ.